(12) United States Patent
Elwell, Jr. et al.

(10) Patent No.: US 8,466,835 B2
(45) Date of Patent: Jun. 18, 2013

(54) SYSTEMS AND METHODS FOR CLOCK CORRECTION

(75) Inventors: John M. Elwell, Jr., Sudbury, MA (US); Robert D. Tingley, Charlestown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 242 days.

(21) Appl. No.: 13/107,618

(22) Filed: May 13, 2011

(65) Prior Publication Data

US 2012/0286995 A1 Nov. 15, 2012

(51) Int. Cl.
*G01S 19/23* (2010.01)
*G01S 19/31* (2010.01)
*G01S 19/05* (2010.01)

(52) U.S. Cl.
USPC ........... 342/357.62; 342/357.71; 342/357.42

(58) Field of Classification Search
USPC ................. 342/357.62, 357.71, 357.42
See application file for complete search history.

(56) References Cited

U.S. PATENT DOCUMENTS

| | | | |
|---|---|---|---|
| 4,918,609 A * | 4/1990 | Yamawaki | 701/478 |
| 5,982,323 A | 11/1999 | Czichy | |
| 5,999,124 A | 12/1999 | Sheynblat | |
| 6,009,376 A | 12/1999 | Brodie et al. | |
| 6,028,551 A | 2/2000 | Schoen et al. | |
| 6,070,078 A | 5/2000 | Camp, Jr. et al. | |
| 6,285,318 B1 | 9/2001 | Schoen et al. | |
| 6,323,804 B1 * | 11/2001 | Kurby et al. | 342/357.64 |
| 6,473,032 B1 | 10/2002 | Trimble | |
| 6,525,687 B2 | 2/2003 | Roy et al. | |
| 6,778,134 B2 | 8/2004 | Dooley et al. | |
| 7,042,392 B2 * | 5/2006 | Whelan et al. | 342/357.29 |
| 7,149,534 B2 | 12/2006 | Bloebaum et al. | |
| 7,372,400 B2 | 5/2008 | Cohen et al. | |
| 7,463,979 B2 | 12/2008 | King | |
| 7,489,926 B2 | 2/2009 | Whelan et al. | |
| 7,554,481 B2 | 6/2009 | Cohen et al. | |
| 7,579,987 B2 | 8/2009 | Cohen et al. | |
| 7,583,225 B2 | 9/2009 | Cohen et al. | |
| 7,786,931 B2 | 8/2010 | Monnerat et al. | |
| 7,826,830 B1 | 11/2010 | Patel et al. | |
| 7,904,243 B2 | 3/2011 | Cohen et al. | |
| 1,014,870 A1 | 6/2011 | Cohen et al. | |
| 2004/0042576 A1 | 3/2004 | Anderson | |
| 2009/0281729 A1 | 11/2009 | Duffett-Smith et al. | |
| 2009/0315764 A1 | 12/2009 | Cohen et al. | |
| 2011/0032144 A1 | 2/2011 | Cohen et al. | |

FOREIGN PATENT DOCUMENTS

EP 1 079 285 A2 2/2001

OTHER PUBLICATIONS

International Search Report and Written Opinion for PCT/US2012/036107, mailed Aug. 7, 2012, 11 pages.

* cited by examiner

*Primary Examiner* — Cassie Galt
(74) *Attorney, Agent, or Firm* — Goodwin Procter LLP

(57) ABSTRACT

A non-GPS satellite-based system enables correction of a local clock in a user device to facilitate GPS-based location determination.

27 Claims, 2 Drawing Sheets

SYSTEMS AND METHODS FOR CLOCK CORRECTION

STATEMENT REGARDING FEDERALLY SPONSORED RESEARCH OR DEVELOPMENT

This invention was made with government support under Contract Number N00014-06-D-0171-0000 awarded by the U.S. Office of Naval Research. The U.S. Government has certain rights in the invention.

FIELD OF THE INVENTION

In various embodiments, the present invention relates to global positioning system (GPS) based location determination systems, and in particular to clock correction employed in such systems.

BACKGROUND

In recent years, GPS-based location determination and navigation have become widely popular. For example, in-car navigation systems, cell phones, and other hand-held wireless communication devices (e.g., BlackBerrys, tablet PCs, etc.) often feature location determination and employ a GPS receiver. A GPS receiver typically receives a GPS signal transmitted from a GPS satellite and extracts from the signal information needed for location determination. In general, a GPS signal includes frames of message data (such as the satellite's ephemeris data, almanac data, etc.), and a GPS receiver can determine the time of transmission of the message data by identifying the frame structure of the received GPS signal.

Generally, the GPS receiver also determines the exact time at which the message was received. The difference between the time of reception and the time of transmission is the time taken by the GPS signal to travel from the satellite to the receiver. Because the GPS signal travels at approximately the speed of light, the time difference described above multiplied by the speed of light yields the range (i.e., distance) between the GPS satellite and the GPS receiver. The location of the GPS receiver is then often determined based on its range. However, because the speed of light is a large quantity (approximately $3 \times 10^8$ m/s), small errors in the measurement of the difference between the time of reception and the time of transmission can cause large errors in the range determination, thereby causing inaccurate location determination. For example, an error of 1 ms in time difference can cause the determined location to be off by about 300 km from the actual location.

Usually, a GPS satellite contains a very high precision clock, such as an atomic clock, and, hence, the time of transmission of the message embedded in the frame structure of the GPS signal tends to be extremely accurate, e.g., within a few picoseconds per day of the standard universal time. The GPS receivers used in commercial applications such as in-car navigation systems and cell phones do not, however, typically include a high-precision atomic clock due to cost limitations. Instead, these receivers commonly employ a substantially cheaper, and less precise, crystal-oscillator-based clock to determine the time of reception of the message in the received GPS signal. These local clocks in the receivers are then typically corrected in order to accurately determine location.

Two methods, namely, the single difference (SD) method and the double difference (DD) method, are commonly employed for clock correction. In the SD method, the ranges of two satellite receivers are determined from one satellite. The satellite can be a GPS satellite or a non-GPS satellite, such as a satellite used for radio or TV broadcast. From a comparison of these ranges, an error in the satellite's clock can be mitigated or eliminated. In the DD method, a pair of range values from two satellites is determined for each of two receivers. By comparing these four range values, both the satellite-clock error and the error in the local clock at each of the receivers can be mitigated or eliminated. Clock correction using the SD or DD methods, however, initially requires exact knowledge of the satellites' and/or the receivers' locations. Furthermore, for local-clock correction, the SD and DD methods require range determination with respect to at least two satellites.

In addition still, even when clock-correction information is available at a GPS receiver, in certain high-noise situations (e.g., in urban areas having many high-rise buildings, in wooded, remote areas, etc.) a GPS receiver may require assistance in determining the time of transmission of a message from the received GPS signal, as explained herein. Typically, the GPS signal broadcast from a GPS satellite is synthesized by modulating a carrier (i.e., a waveform at a certain frequency) according to a 1023-chip long pseudo-random (PN) code sequence. The PN code sequence designated to each GPS satellite is unique, and each satellite modulates its carrier by repeating the designated 1023-chip-long PN sequence at about every millisecond (i.e., at a rate of approximately 1.023 million chips per second.) The carrier modulated using the PN code is further modulated using message data the GPS satellite broadcasts. The message data include the GPS satellite's ephemeris and almanac, i.e., data related to the satellite's orbit, and are transmitted at a rate of about 50 Hz (i.e., one message data bit per approximately 20 ms interval). The modulated GPS signal is received at a GPS receiver after a propagation delay related to the distance between the GPS satellite and receiver.

In theory, if the GPS receiver locally generated an exact duplicate of the transmitted GPS signal at exactly the same time the GPS signal was transmitted, and delayed the duplicate signal by exactly the propagation delay, the received GPS signal and the duplicate signal would align perfectly. To produce such a theoretical duplicate signal, the GPS receiver would need to know the PN code designated to the GPS satellite transmitting the received GPS signal, the message data included in the received GPS signal, and the exact propagation delay.

In practice, although a GPS receiver may not know the PN code designated to the GPS satellite from which a GPS signal was received, the PN codes of all 30 GPS satellites in orbit at present are generally known by the receiver. As such, a typical GPS receiver generates one duplicate signal corresponding to the PN code of each GPS satellite (i.e., 30 or fewer at present, and more if additional GPS satellites become available in the future). Each duplicate signal is then delayed by a number of estimated propagation delay values. Each of the delayed duplicate signals (i.e., a candidate signal) is then correlated with the received signal, and the candidate signal that results in maximum correlation relates to the PN code of the GPS satellite from which the GPS signal was received, and to the propagation delay of the GPS signal.

Each one of these numerous correlations involving 1023-chip long PN sequences must be completed, however, within the duration of a signal message data bit, i.e., within 20 ms, as described above. Otherwise, the next transmitted message data bit may cause the received GPS signal to change, causing the subsequent correlations to be inaccurate. One approach to addressing this problem is to store the received GPS signal in memory, and to use the stored signal for all correlations (also called integration). This, however, requires a large memory and can increase the size and/or cost of the GPS receiver. Another approach is to assist a GPS receiver by providing the message data to it, so that the receiver may extend integration (i.e., continue with the correlations) beyond the 20 ms window. As explained below, some ground stations know the message data because they initially transmit the message data to the GPS satellites for subsequent broadcast thereof. As a result, these ground stations can provide the message data to a GPS receiver.

Currently, High Integrity GPS (known as iGPS) provides both clock-correction information and the message data to commercial GPS receivers. The iGPS includes ground stations and a constellation of satellites that is dedicated to assisting in GPS navigation. The ground stations employed in iGPS know the message data, as described above, their own locations, and the locations of the dedicated satellites. Therefore, in one approach to addressing the above described problems in the operation of a GPS receiver, the ground stations function as satellite receivers in providing clock-correction based on the SD or DD methods. The ground stations also assist GPS receivers by providing the message data. The clock correction and message data are provided via satellite links using dedicated satellites.

However, one important challenge faced by GPS-based location determination and navigation systems is their dependence on the iGPS. Without iGPS, many GPS receivers may not function accurately, if at all. Even if a substitute to iGPS were available, the SD and DD methods for local clock correction require at least two satellites, and knowledge of the satellites' exact locations. Though many commercial satellites orbit the earth, their exact location information is not available in some instances.

Needs therefore exist for improved systems and methods of correcting a local clock at a GPS receiver, and for providing assistance thereto in extracting information from a received GPS signal, so as to facilitate GPS-based location determination and navigation.

SUMMARY

In various embodiments, the present invention enables clock correction at a user device for use in GPS-based location determination using only one satellite, and without requiring knowledge of that satellite's location. This is achieved, in part, by locally estimating a time of transmission of a signal received from a non-GPS satellite of opportunity, and by receiving an accurate, corrective estimate of the time of transmission. Both the local and the corrective estimates are based on the determination of the arrival time of the non-GPS signal and various propagation delays, none of which depend on the exact location of the satellite. Using the local and corrective estimates, the local clock of the user device is corrected so that the user device's location can be accurately determined using a GPS signal. The user device may receive the clock correction information via a terrestrial link, without requiring dedicated satellites, and may also receive message data for efficient synchronization of the GPS signal via the terrestrial link. As used herein, the term "terrestrial link" generally refers to a communication link implemented using any communication system that does not require the use of a satellite. For example, the terrestrial link may be implemented as a wireless link between a cell-phone tower and a cell phone, as a wireless link between a Wi-Fi hotspot and a mobile device (such as a BlackBerry, a tablet PC, or a cell phone), etc.

In general, in one aspect, embodiments of the invention feature a method of correcting a local clock at a user device that, for example, performs GPS-based location determination and/or navigation. The method includes receiving, at the user device, a non-GPS signal from a non-GPS satellite, identifying a message header in the non-GPS signal, and computing a local estimate of a time of transmission of the non-GPS signal based on the uncorrected local clock at the user device. The method also includes receiving, at the user device via, e.g., a terrestrial link, a correction signal that includes (i) a message-header indication and (ii) a corrective estimate of the time of transmission of the non-GPS signal. The local clock may then be corrected based on the identified message header, the message-header indication, and the local and corrective estimates of the time of transmission of the non-GPS signal. Typically, the message header and the message-header indication are compared to ascertain that the corrective estimate relates to the local estimate. Both computing the local estimate and correcting the local clock may be performed without knowledge of the non-GPS satellite's location.

In some embodiments, the method further includes receiving, at the user device, a GPS signal from a GPS satellite, and determining a time of transmission of the GPS signal. A location of the user device may then be determined based on the time of transmission of the GPS signal and the corrected local clock. The method may also include receiving multiple message bits corresponding to data broadcast by the GPS satellite, and correlating the GPS signal with a local signal based on the multiple message bits so as to determine if the GPS and local signals are synchronized. If so, the time of transmission of the GPS signal may be determined based on a phase of the GPS signal.

Receiving the non-GPS signal, identifying the message header, computing the local estimate of the time of transmission of the non-GPS signal, receiving the correction signal, and correcting the local clock may be performed iteratively so as to improve the accuracy of the clock correction. In some embodiments, computing the local estimate of the time of transmission of the non-GPS signal includes determining a time of arrival of the non-GPS signal based on the local clock, and adjusting the time of arrival according to one or more of a line of sight delay, ionospheric delay, tropospheric delay, and multipath delay.

In general, in another aspect, embodiments of the invention feature a system for clock correction. The system includes a clock generator for generating a local clock, a first receiver for receiving a non-GPS signal from a non-GPS satellite, and a correlator for identifying a message header in the non-GPS signal. The correlator may identify the message header by, for example, correlating multiple known message headers corresponding to non-GPS satellites with the received non-GPS signal. The system may also include a second receiver for receiving (e.g., via a terrestrial link) a correction signal that includes (i) a message-header indication and (ii) a corrective estimate of a time of transmission of the non-GPS signal. Furthermore, the system may include a processor for (i) computing, based on the local clock, a local estimate of the time of transmission of the non-GPS signal, and (ii) correcting the local clock based on the identified message header, the message-header indication, and the local and corrective estimates of the time of transmission of the non-GPS signal. The processor may operate without knowledge of the non-GPS satellite's location.

In some embodiments, the system also includes a third receiver for receiving a GPS signal from a GPS satellite. In these embodiments, the processor may be further configured to determine a time of transmission of the GPS signal, and a location of the system based on the time of transmission of the GPS signal and the corrected local clock. In some embodiments, the second receiver is also configured to receive multiple message bits corresponding to data broadcast by the GPS satellite. In these instances, the system may include a signal generator for generating a local signal based on the multiple message bits. The correlator may also be configured to correlate the GPS signal with the local signal to determine if the GPS and local signals are synchronized. If so, the processor may determine the time of transmission of the GPS signal based on a phase of the GPS signal.

In some embodiments, the non-GPS satellite is a geo-synchronous (GEO) satellite; in other embodiments, the non-GPS satellite is a low-earth-orbiting (LEO) satellite. Alternatively, or in addition, the non-GPS satellite may be capable of ultra high frequency (UHF) communication.

In general, in yet another aspect, embodiments of the invention feature a method of aiding in correcting a local clock at a user device. The method includes receiving, at a ground site, a non-GPS signal from a non-GPS satellite, identifying a message header in the non-GPS signal, and computing an estimate of a time of transmission of the non-GPS signal based on a precision clock. In addition, the method includes transmitting, from the ground site to the user device, a correction signal for correcting the local clock at the user device. The correction signal includes (i) an indication of the message header and (ii) the estimate of the time of transmission of the non-GPS signal. Again, the computing step may be performed without knowledge of the non-GPS satellite's location.

In some embodiments, the method includes transmitting, from the ground site to the user device, multiple message bits corresponding to data broadcast by a GPS satellite. The method may also include receiving a GPS signal from the GPS satellite, and extracting the message bits from the GPS signal prior to transmitting those message bits to the user device. The plurality of message bits may be transmitted via a terrestrial link.

In general, in still another aspect, embodiments of the invention feature a system for aiding in correcting a local clock at a user device. The system includes a first receiver for receiving a non-GPS signal from a non-GPS satellite, a correlator for identifying a message header in the non-GPS signal, and a processor for computing an estimate of a time of transmission of the non-GPS signal based on a precision clock. The system also includes a transmitter for transmitting, to the user device, a correction signal for correcting the local clock at the user device. The correction signal includes (i) an indication of the message header and (ii) the estimate of the time of transmission of the non-GPS signal. In general, the processor may operate without knowledge of the non-GPS satellite's location. Moreover, in various embodiments, the processor need not obtain permission to communicate with the non-GPS satellite because the processor merely identifies one or more message headers in the signal received from the non-GPS satellite without further reading (or needing to read) the additional satellite data contained in that signal, and without transmitting (or needing to transmit) any commands and/or data to the non-GPS satellite.

In some embodiments, the transmitter is further configured to transmit, to the user device via, e.g., a terrestrial link, multiple message bits corresponding to data broadcast by a GPS satellite. The system may further include a second receiver for receiving a GPS signal from the GPS satellite, and the processor may extract the multiple message bits from the GPS signal prior to the transmitter transmitting these multiple message bits to the user device.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and in some embodiments±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
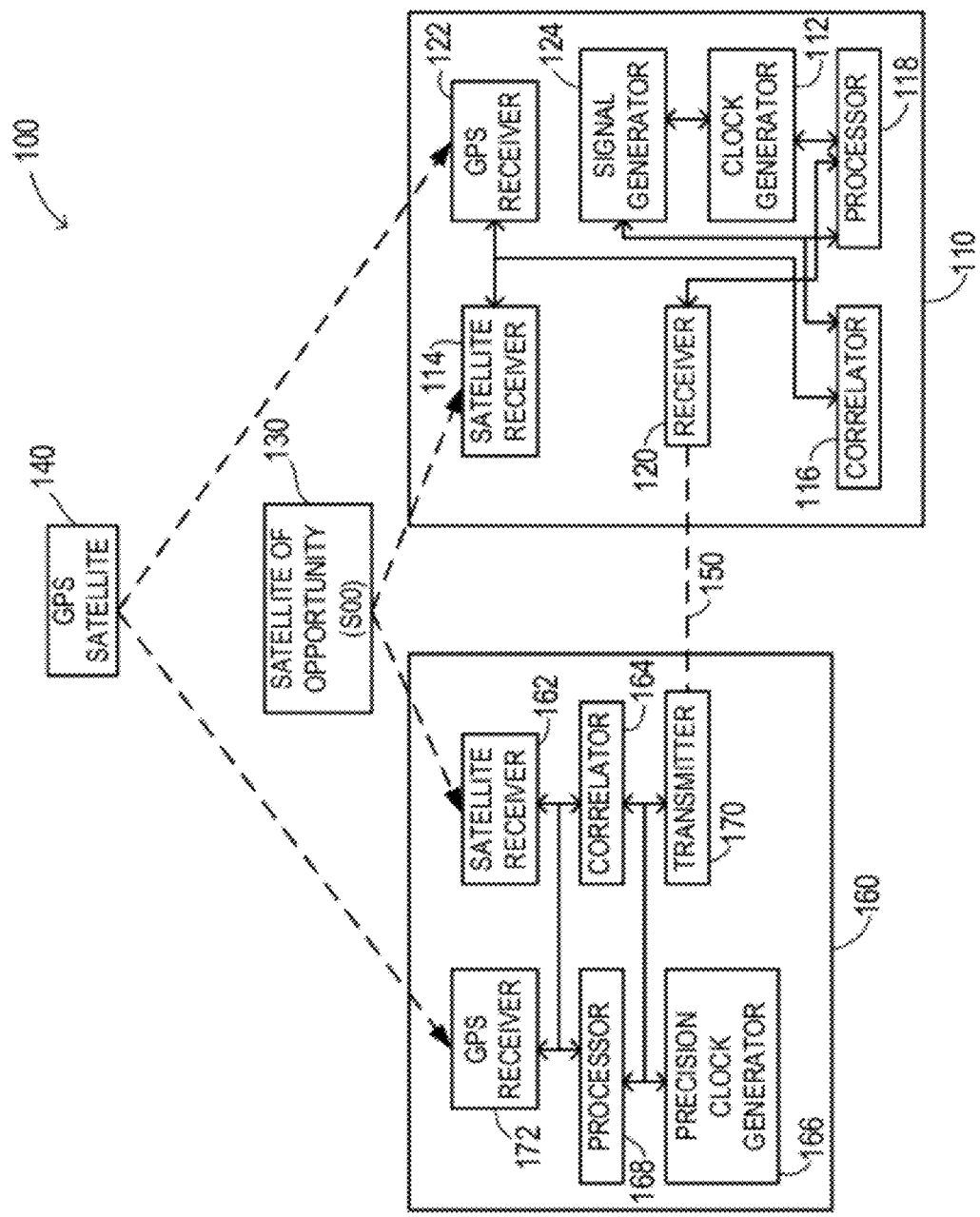
FIG. 1 illustrates a user device and a ground site of a GPS-based location determination system in accordance with one embodiment of the invention.

FIG. 1 depicts a GPS-based location determination system 100 that includes a user device 110. The user device 110 can be a stand-alone GPS receiver, or a mobile computing and/or communication device such as a cell phone, BlackBerry, etc. The user device 110 includes a clock generator 112 to generate a local clock using a relatively inexpensive oscillator, such as, for example, a temperature compensated crystal oscillator (TCXO).

The user device 110 also includes a satellite receiver 114 for receiving a non-GPS signal from a non-GPS satellite 130. The non-GPS satellite 130 can be a commercial satellite, such as, for example, one used for radio or TV broadcast. It can be a low-earth-orbiting (LEO) satellite or a geo-synchronous (GEO) satellite, and the non-GPS satellite 130 may be able to broadcast data in the UHF range. In some instances, the non-GPS satellite 130 may be an un-cooperative satellite, i.e., a satellite that has stopped accepting commands from its control stations, yet continues to broadcast unknown messages. In general, the non-GPS satellite 130 is a satellite of opportunity (SOO), i.e., any non-GPS satellite from which the user device 110 is able to receive a signal at a certain time.

In general, the non-GPS satellite 130 broadcasts data unknown to the user device 110, but periodically transmits a message header, typically only a few data bits long, that is publically known. In various embodiments, the user device 110 has knowledge of (e.g., stores) one or more message headers transmitted by various non-GPS satellites. A correlator 116 in the user device 110 correlates one or more of the known message headers with the received non-GPS signal, and determines if a certain message header was found in the received non-GPS signal. The identification of a message header in the received non-GPS signal indicates the beginning of a new cycle of data transmission by the non-GPS satellite 130. Accordingly, using the local clock generated by the clock generator 112 and the identification of a message header by the correlator 116, a processor 118 in the user device 110 computes a local estimate of the time of transmission of the non-GPS signal.

More specifically, the processor 118 determines a local time of arrival of the non-GPS signal based on the local clock. The user device 110 also has information about the various types of delays the non-GPS signal may encounter as it propagates from the non-GPS satellite 130 to the user device 110. Examples of these delays include line of sight delay (typically about 3 msec for an LEO satellite and up to about 140 msec for a GEO satellite, including approximately 3 nsec of ephemeris error), ionospheric delay due to free electrons (generally up to about 100 nsec), tropospheric delay that is in part due to water vapor and oxygen (generally up to about 100 nsec), and multipath delay that is in part due to scattering in the vicinity of the satellite receiver 114 (typically fluctuates within a few milliseconds). The ionospheric and tropospheric delays often remain nearly unchanged for a duration lasting about tens of seconds. The processor 118 subtracts one or more of these propagation delays from the local time of arrival to obtain the local estimate of the time of transmission of the non-GPS signal.

The receiver 120 in the user device 110 receives a correction signal that includes a message-header indication and a corrective estimate (i.e., more precise estimate) of the time of transmission of the non-GPS signal. The correction signal, which is described in detail below, may be received via a terrestrial link 150. The processor 118 then determines whether the message-header indication in the correction signal corresponds to (e.g., matches) the message header identified by the correlator 116. If such correspondence is found, the processor 118 compares the local and corrective estimates of the time of transmission of the received non-GPS signal, and computes any required correction for the local clock at the user device 110. Then, the clock generator 112 adjusts the local clock so that it may be nearly as accurate as an atomic clock. In order to improve the accuracy of the local clock, the steps of receiving the non-GPS signal, identifying the message header, computing a local estimate of the time of transmission of the non-GPS signal, receiving the correction signal, and correcting the local clock may be performed iteratively. In performing these steps to improve the accuracy of the local clock, the processor 118 (and the user device 110, in general) does not need to know the location of the non-GPS satellite 130.

The user device 110 also includes a GPS receiver 122 for receiving a GPS signal from a GPS satellite 140. In one embodiment, a signal generator 124 at the user device 110 uses the local lock (which may be corrected or uncorrected) generated by the clock generator 112, and generates multiple candidate GPS signals. Specifically, as described above, the signal generator 124 generates, as candidates, delayed duplicate GPS signals corresponding to various combinations of the PN codes designated to different GPS satellites and multiple estimated values of the propagation delay for the received GPS signal.

In the user device 110, the receiver 120 also receives message data (i.e., a plurality of data bits corresponding to those being broadcast by the GPS satellite 140) via the terrestrial link 150, and the signal generator 124 uses that message data in generating the candidate signals so that extended integration (i.e., correlation, as described above) for longer than the duration of a single message data bit (e.g., about 20 ms) is feasible. The user device 110 typically performs the extended integration for about 1 second. It should be understood, however, that user devices 110 that perform integration for durations longer or shorter than 1 second are also within the scope of the invention. It should also be understood that receiving message data and using that data in the generation of candidate signals is optional, and that user devices 110 that do not receive and/or use the message data are also within the scope of the invention.

The correlator 116 correlates each of the candidate signals with the received GPS signal, and the received GPS signal is determined to be synchronized with the delayed duplicate signal (i.e., candidate signal) that yields maximum correlation. From a phase of the synchronized GPS signal (i.e., the identification of a sequence of data frames and sub-frames contained therein), the processor 118 determines the time of transmission of the GPS signal. In addition, based on the corrected local clock, the processor 118 determines the time of reception of the GPS signal. Finally, based on the difference between the time of transmission and the time of reception, the processor 118 computes the distance (i.e., range) of the user device 110 from the GPS satellite 140, and then computes the location of the user device 110 based on its range.

As illustrated in FIG. 1, the system 100 also includes a ground site 160 that provides, for example, the required information for clock correction to the user device 110. The ground site 160 can be a ground station different from those employed in the iGPS. For example, the ground site 160 can be a base station of a cell phone system, or a base station of a radio, TV, or satellite broadcast system, etc.

Similar to the user device 110, the ground site 160 includes a satellite receiver 162 that receives a non-GPS signal from the non-GPS satellite 130. The ground site 160 also has knowledge of (e.g., stores) one or more message headers transmitted by various non-GPS satellites. A correlator 164 in the ground site 160 correlates the one or more known message headers with the received non-GPS signal, and determines if a certain message header was found in the received non-GPS signal. As described above, the identification of a message header in the received non-GPS signal indicates the beginning of a new cycle of data transmission by the non-GPS satellite 130.

The ground site 160 also includes a precision clock generator 166 that generates a highly precise clock (e.g., a clock having an error of no more than several tens of picoseconds per day). In some instances, the precision clock generator 166 may even generate an atomic clock, for example of the type included within the GPS satellite 140. Using the highly precise clock generated by the precision clock generator 166 and the identification of a message header by the correlator 164, a processor 168 included within the ground site 160 may compute an estimate of the time of transmission of the non-GPS signal. As in the case of the user device 110, the processor 168 determines the time of arrival of the non-GPS signal, and subtracts one or more of the propagation delays therefrom (as described above) to compute the estimated time of transmission.

In one embodiment, the ground site 160 knows its exact location, and hence knows the various propagation delays accurately, as they depend on the location at which the non-GPS signal is being received. Furthermore, the time of arrival of the non-GPS signal is also determined accurately because the clock at the ground site 160 is highly precise. Thus, the processor 168 computes a highly accurate estimate of the time of transmission of the non-GPS signal. However, in determining the time of transmission of the non-GPS signal, the ground site 160 does not require knowledge of the location of the non-GPS satellite 130.

In one embodiment, the ground site 160 includes a transmitter 170 that transmits, to the user device 110 via the terrestrial link 150, a clock correction signal that includes an indication of the message header and the highly accurate estimate of the time of transmission of the non-GPS signal. This information can be employed by the user device 110 to correct its local clock, as described above. In addition, the ground site 160 may also provide the various propagation delays and/or its location information to the user device 110 via the link 150.

With reference still to FIG. 1, the ground site 160 also includes a GPS receiver 172. The GPS receiver 172 receives a GPS signal from the GPS satellite 140, and the processor 168 extracts the message data from the GPS signal (i.e., the message data bits corresponding to the ephemeris and/or almanac of the GPS satellite 140). The transmitter 170 may then transmit the message data to the user device 110, via the terrestrial link 150, for use in extending the integration time, as described above. It should be understood, however, that some ground sites 160, such as the ground stations employed in iGPS, may already know the message data, and, hence, need not extract the message data. Also, some ground sites 160 may not transmit the message data to the user device 110, and instead may transmit only the correction signal. In addition, in some embodiments, the ground site 160 provides the correction signal and/or the message data, or parts thereof, not via the terrestrial link 150 but via a different, satellite link.

Figure 2:
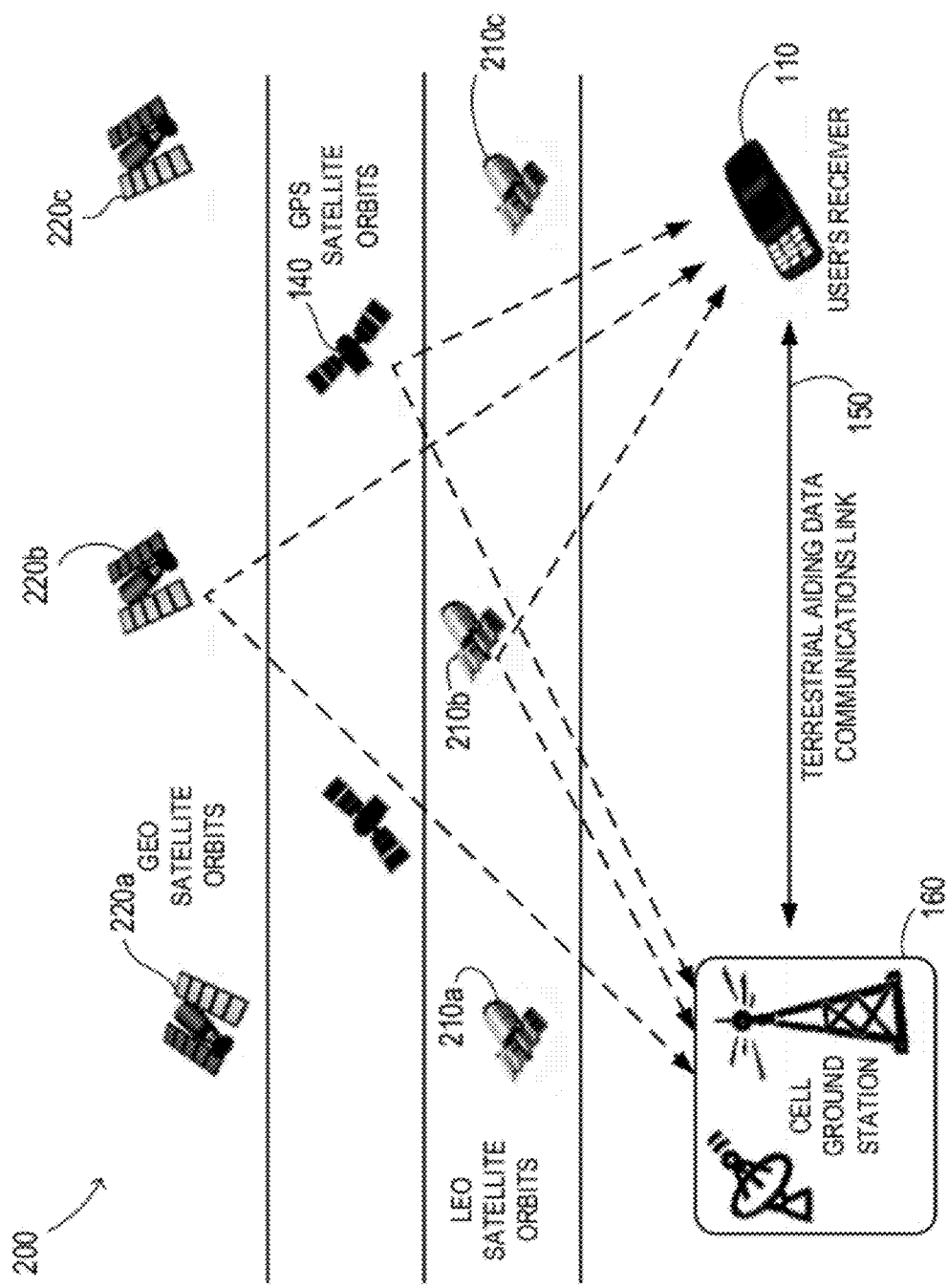
FIG. 2 illustrates a GPS-based location determination system in accordance with one embodiment of the invention.

FIG. 2 depicts an exemplary GPS-based location determination system 200 that includes LEO satellites 210*a*, 210*b*, 210*c*. In the system 200, the satellite of opportunity (i.e., the non-GPS satellite 130 of FIG. 1) is, in one exemplary instance, the LEO satellite 210*b*. The LEO satellite 210*b* can provide a strong signal for clock correction, and, hence, may enable location determination when the user device 110 is located inside a building, where the received GPS signal may be relatively weak. The LEO satellite 210 may also employ UHF communication that can penetrate vegetation, and, thus, provide clock correction when the user device 110 is located in a forest under, for example, a thick canopy.

The system 200 also depicts GEO satellites 220*a*, 220*b*, 220*c*. The GEO satellite 220*b* is the satellite of opportunity in another illustrative instance when the user device 110 is located in an urban canyon (i.e., between high-rise buildings). Because the GEO satellite 220*b* is at a very high elevation, its radiation is received on earth at a sharp angle, and may thus reach the user device 110 in the urban canyon, thereby allowing the local clock of the user device 110 to be corrected.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A method of correcting a local clock at a user device, the method comprising:
   receiving, at the user device, a non-GPS signal from a non-GPS satellite;
   identifying a message header in the non-GPS signal;
   computing, based on the local clock at the user device, a local estimate of a time of transmission of the non-GPS signal;
   receiving, at the user device, a correction signal comprising (i) a message-header indication and (ii) a corrective estimate of the time of transmission of the non-GPS signal; and
   correcting the local clock based on the identified message header, the message-header indication, and the local and corrective estimates of the time of transmission of the non-GPS signal.

2. The method of claim 1, wherein both the computing step and the correcting step are performed without knowledge of a location of the non-GPS satellite.

3. The method of claim 1, further comprising:
   receiving, at the user device, a GPS signal from a GPS satellite;
   determining a time of transmission of the GPS signal; and
   determining a location of the user device based on the time of transmission of the GPS signal and the corrected local clock.

4. The method of claim 3, further comprising:
   receiving a plurality of message bits corresponding to data broadcast by the GPS satellite; and
   correlating the GPS signal with a local signal based on the plurality of message bits to determine if the GPS and local signals are synchronized.

5. The method of claim 4, wherein, if the GPS and local signals are synchronized, the time of transmission of the GPS signal is determined based on a phase of the GPS signal.

6. The method of claim 1, wherein the steps of receiving the non-GPS signal, identifying, computing, receiving the correction signal, and correcting are performed iteratively.

7. The method of claim 1, wherein the computing step comprises:
   determining a time of arrival of the non-GPS signal based on the local clock; and
   adjusting the time of arrival according to at least one of a line of sight delay, an ionospheric delay, a tropospheric delay, and a multipath delay.

8. The method of claim 1, wherein the correction signal is received via a terrestrial link.

9. A system for clock correction, comprising:
   a clock generator for generating a local clock;
   a first receiver for receiving a non-GPS signal from a non-GPS satellite;
   a correlator for identifying a message header in the non-GPS signal;
   a second receiver for receiving a correction signal comprising (i) a message-header indication and (ii) a corrective estimate of a time of transmission of the non-GPS signal; and
   a processor for (i) computing, based on the local clock, a local estimate of the time of transmission of the non-GPS signal, and (ii) correcting the local clock based on the identified message header, the message-header indication, and the local and corrective estimates of the time of transmission of the non-GPS signal.

10. The system of claim 9, wherein the processor operates without knowledge of a location of the non-GPS satellite.

11. The system of claim 9, further comprising a third receiver for receiving a GPS signal from a GPS satellite, and wherein the processor is further configured to determine (iii) a time of transmission of the GPS signal, and (iv) a location of the system based on the time of transmission of the GPS signal and the corrected local clock.

12. The system of claim 11, wherein the second receiver is further configured to receive a plurality of message bits corresponding to data broadcast by the GPS satellite, and further comprising a signal generator for generating a local signal based on the plurality of message bits.

13. The system of claim 12, wherein the correlator is further configured to correlate the GPS signal with the local signal to determine if the GPS and local signals are synchronized.

14. The system of claim 13, wherein the processor, if the GPS and local signals are synchronized, is further configured to (v) determine the time of transmission of the GPS signal based on a phase of the GPS signal.

15. The system of claim 9, wherein the second receiver is configured to receive the correction signal via a terrestrial link.

16. The system of claim 9, wherein the non-GPS satellite is at least one of a GEO satellite or an LEO satellite.

17. The system of claim 9, wherein the non-GPS satellite is capable of UHF communication.

18. A method of aiding in correcting a local clock at a user device, the method comprising:
   receiving, at a ground site, a non-GPS signal from a non-GPS satellite;
   identifying a message header in the non-GPS signal;
   computing, based on a precision clock, an estimate of a time of transmission of the non-GPS signal; and
   transmitting, from the ground site to the user device, a correction signal for correcting the local clock at the user device, the correction signal comprising (i) an indication of the message header and (ii) the estimate of the time of transmission of the non-GPS signal.

19. The method of claim 18, wherein the computing step is performed without knowledge of a location of the non-GPS satellite.

20. The method of claim 18, further comprising transmitting, from the ground site to the user device, a plurality of message bits corresponding to data broadcast by a GPS satellite.

21. The method of claim 20, further comprising:
   receiving a GPS signal from the GPS satellite; and
   extracting the plurality of message bits from the GPS signal prior to transmitting the plurality of message bits to the user device.

22. The method of claim 20, wherein the plurality of message bits are transmitted via a terrestrial link.

23. A system for aiding in correcting a local clock at a user device, the system comprising:
   a first receiver for receiving a non-GPS signal from a non-GPS satellite;
   a correlator for identifying a message header in the non-GPS signal;
   a processor for computing, based on a precision clock, an estimate of a time of transmission of the non-GPS signal; and
   a transmitter for transmitting, to the user device, a correction signal for correcting the local clock at the user device, the correction signal comprising (i) an indication of the message header and (ii) the estimate of the time of transmission of the non-GPS signal.

24. The system of claim 23, wherein the processor operates without knowledge of a location of the non-GPS satellite.

25. The system of claim 23, wherein the transmitter is further configured to transmit, to the user device, a plurality of message bits corresponding to data broadcast by a GPS satellite.

26. The system of claim 25, further comprising a second receiver for receiving a GPS signal from the GPS satellite, and wherein the processor is further configured to extract the plurality of message bits from the GPS signal prior to the transmitter transmitting the plurality of message bits to the user device.

27. The system of claim 25, wherein the transmitter is configured to transmit the plurality of message bits via a terrestrial link.

* * * * *